United States Patent

Schlemenat et al.

[11] Patent Number: 5,782,576
[45] Date of Patent: Jul. 21, 1998

[54] DETACHABLE CONNECTION OF ROTATIONALLY SYMMETRICAL COMPONENTS

[76] Inventors: Alfred Schlemenat, Dörnchen 2, D-45701 Herten; Walter Langhoff, Frankfurter Str. 209, D-46562 Voerde, both of Germany

[21] Appl. No.: 754,964

[22] Filed: Nov. 22, 1996

[30] Foreign Application Priority Data

Nov. 25, 1995 [DE] Germany ................. 195 44 033.1
Feb. 9, 1996 [DE] Germany ................. 196 04 702.1

[51] Int. Cl.⁶ ................. F16D 1/00; F16L 19/025
[52] U.S. Cl. ................. 403/337; 285/337; 285/417
[58] Field of Search ................. 403/335, 337; 285/337, 417, 404, 399

[56] References Cited

U.S. PATENT DOCUMENTS

| | | | |
|---|---|---|---|
| 1,366,955 | 2/1921 | Schneible | 403/337 X |
| 1,388,268 | 8/1921 | Knutson | |
| 3,438,658 | 4/1969 | Stevens | 285/417 X |
| 3,469,852 | 9/1969 | Smith et al. | 285/337 X |
| 3,873,138 | 3/1975 | Griffiths et al. | |
| 4,279,530 | 7/1981 | Mullenberg | 403/337 |
| 5,351,999 | 10/1994 | Hattori | 285/404 |

FOREIGN PATENT DOCUMENTS

| | | |
|---|---|---|
| 2 539 480 | 1/1983 | France. |
| 1 252 483 | 10/1967 | Germany. |
| 1 475 860 | 3/1969 | Germany. |
| 33 17 146 A1 | 11/1984 | Germany. |

*Primary Examiner*—Thomas R. Hannon
*Attorney, Agent, or Firm*—McGlew and Tuttle

[57] ABSTRACT

A connection of rotationally symmetrical components, in which minimal overturning torques and consequently minimal deformations of the supporting components are generated by generating the smallest, theoretically possible lever arm, on which the forces of the connection to be transmitted act. As a result, a nonpositive and positive-locking connection is obtained, in which the bolts no longer represent the dominantly loaded component. The maintenance and testing of the bolts is considerably reduced in all connections. Optimal flux of forces through the components close to the line of force application is achieved in the case of the tensioning of large rolling bearings. The requirements in terms of concentration of the contact pressure of the bearing tensioning in the vicinity of the line of force application are satisfied. In the case of a flange connection, optimal conditions are provided for tightness, besides a more economical manufacture, compared with the prior-art designs. Only extremely short bolts of a significantly smaller diameter are needed. A one-part sleeve surrounds two collars with tubular or cylindrical attachment provided on it. Wedge-shaped tensioning elements 2 are pulled in in the direction of the bolt axis by means of tension bolts between the inner, conical contact surfaces of the sleeve and the flat surfaces of the collars. The collars are tensioned with the sleeve via the wedge-shaped tensioning elements. The bolts are loaded only with a portion of the axial forces occurring.

14 Claims, 5 Drawing Sheets

DETACHABLE CONNECTION OF ROTATIONALLY SYMMETRICAL COMPONENTS

FIELD OF THE INVENTION

The present invention pertains to a detachable connection of rotationally symmetrical components, e.g., flange connections of tubular or cylindrical attachments, connections of large rolling bearings with their connection structures, cover locks of high-pressure cylinders, as well as the tensioning of rotating bodies with their connection structures.

BACKGROUND OF THE INVENTION

Known flange connections comprise two flanges, a seal and a number of bolts. The bolts have to transmit all the forces that occur. The flange leaves are designed as welding neck flanges or as a loose flange with short stub end or weld-on collar. The seal is arranged in the secondary flux of force as well as in the main flux of force. However, seals arranged in the secondary flux of force are highly sensitive to gaping of the contact surfaces, so that the seals are arranged mainly in the main flux of force because of the relatively great deformations of the flange which occur during operation.

Contrary to a seal arranged in the main flux of force, a seal arranged in the secondary flux of force does not participate in the force transmission of the connection proper. The advantages of this seal arrangement are basically that the seal embedded in a groove cannot be overstressed even in the case of pulsating and alternating loads to be absorbed and in the case of loads due to external heat radiation. The application and at times complicated checking of the forces necessary for the prestrain of a seal arranged in the main flux of force are also eliminated. New seal materials or seals composed of a plurality of materials always require stronger forces for prestrain. These loads represent the highest type of burden, which is to be used for the dimensioning of the components, especially in the case of low inner pressure loads.

The classification of asbestos to the group of very hazardous and cancer-causing materials requires the replacement of the asbestos-containing seal materials, which have been successfully used in industry for many years, with asbestos-free seals, with which only little operating experience is available to date. Based on new regulations (Technical Instructions for Air [TA-Luft], Accident Ordinance, etc.), this leads to the minimization of emission levels and, with respect to economic aspects, to considerably more stringent requirements being imposed on the tightness of flange connections in the past years.

The high safety requirements imposed mainly in nuclear plants until a few years ago were therefore also applied to other branches of industry, e.g., through a new pressure vessel ordinance, so that increasing attention is paid to the sealing properties of a flange connection on the international level as well.

Large numbers of detachable flange connections are used in a power plant or in a chemical plant. The reliability of operation, the economy, and the emission characteristics of such plants depend mostly on the sealing characteristics of these flange connections.

As is described in the pertinent technical literature, the tightness of flange connections is affected essentially by the deformation resistance of the components, the temperature difference between the flange and the bolts, the radial temperature gradient of the flanges, the setting of the threads and the compression of the seal as a consequence of relaxation, and especially by the bolt pretension to be applied during assembly.

In the built-in state, these flanges are tensioned against each other in the axial direction due to the tightening of the bolts. The seal arranged in the main flux of force now undergoes an elastic compression, besides a plastic deformation. The flanges are deformed, and the bolts are extended. In the case of loose flanges with collars, the forces act on the outer edge of the collar due to the overturning of the collar and the loose flange around their overturning center. Linear loads develop, and they generate high contact pressures between the loose flange and the collar, so that these flange designs are not used for applications under high loads.

The above-described flange connections have been specified in international standards for decades. They are used almost exclusively in industrial construction and apparatus engineering, in power plant and pipeline technology, as well as process engineering and chemical plants.

Many manufacturers and users of flange connections, as well as the competent supervisory authorities have recognized the insufficiencies of many calculation methods concerning the tightness characteristics, which have been recognized over the years, and remedy these shortcomings according to their own experience and considerations. Despite continuous discussions and the substantiation of these findings in publications, seminars and lectures at technical universities, leaky flange connections not infrequently cause considerable costs due to loss of production and lead to environmental pollution.

Another fastening means for elements for connecting two flange-shaped parts became known in the 1960s. Inserting a seal, two flange-shaped parts are tensioned to one another by means of a plurality of bolts in this connection with a ring wedge each, divided into a plurality of segments as well as by a plurality of wedge segments, which are arranged in an annular groove of a screw collar ring surrounding both flanges.

The bolts are led through the ring wedge, so that the latter has holes for passing through the screw bolts. The wedge segments are in contact with the ring wedge on the inside and are located in the annular groove of the screw collar ring on the outside. Both components have wedge surfaces, so that a double wedge connection arranged one behind the other is present due to the cooperation of the ring wedge and the wedge segment. This requires the application of double frictional forces for tensioning the connection.

The two flanges are pressed onto each other by screwing the bolts into the threaded blind holes arranged in each flange or, as an alternative, by screwing through bolts, which are led through holes of both flanges and are led through holes of the ring wedge in both embodiments. The dominant diameter, on which the load acts, must therefore be increased to the outside by the diameter of the bolts screwed in. The double wedge connection arranged one behind the other in the radial direction leads to a further increase of the load application point with the holes for passing through the screw bolts. The relatively large lever arm of the opposite forces acting on the flange leaf, which is thus necessary, unfavorably affects the overturning and deformation resistance of the flanges to be connected, so that the seal is arranged in the main flux of force because of the relatively great deformations that become established.

The overturning of the flange leaves to be connected, which becomes established from the state of built-in deformation to the maximum operating load, brings about an axial displacement of the flanges toward each other in the area of the external diameter, at which the necessary state of deformation was produced via wedge segments. The increasing operating pressure causes the wedge segments to become detached from the contact surface of the screw collar ring, so that the pretensioned state is abolished. Thus, the necessary tightness cannot be ensured with the features of this fastening means for elements.

This drawback is also the reason why the above-described flange connection was not accepted by industry, and designs corresponding to the national and international standards mentioned at the beginning still represent the applied state of the art and are used almost exclusively all over the world.

Large rolling bearings are intermediate components of rotatable or pivoting connections, which are used in plant construction, industrial construction and crane construction, in conveying equipment, as well as construction equipment. The task of these bearings is to transmit strong static and dynamic forces and torques. In the prior-art connections of large rolling bearings and their connection structures, the forces and torques are transmitted exclusively by axially arranged bolts made of high-strength materials. Sufficient dimensioning and careful pretensioning determine essentially the reliability of operation of the large rolling bearings. The connection structures must be made correspondingly rigid and they must have rigid connections, because the cross sections of the large rolling bearings are made relatively small compared with their diameters for economic reasons.

Based on sufficient knowledge from torque stand experiments and practical experience, extensive dimensioning guidelines were developed for the fastening bolts and recommendations were prepared for the connection structures. The maintenance instructions, especially the checking of the necessary bolt pretensions, after 600 operating hours or three months, are correspondingly strict. As is shown by damage, torn-off bolts at the corresponding bearing tensioning areas continue to represent the principal cause of several accidents with tower slewing cranes despite these measures. Due to swinging loads, the high-strength bolts represent the component most susceptible to fatigue fracture in this type of connection as well.

It must be stated in conclusion from such damage that too little attention has hitherto been paid to a satisfactory flux of force through the rotary connection. It should consequently be ensured that the line of application of the forces passes through the rolling bodies and that gaping of the clamp joint is avoided by concentrating the contact pressure of the bearing tensioning in the vicinity of the line of force application. This procedure is limited in rotary connection designs which represent the current state of the art because of design conditions.

Neither tensioning nor concentration of the contact pressure of the bearing tensioning close to the line of force application can be achieved even with the features of the prior-art fastening device for elements discussed in the introduction, because the screw bolts must be screwed into or passed through both the stationary part and the rotatable part of the large rolling bearing, besides the necessary, relatively large lever arm of the force introduction.

Cover locks on high-pressure cylinders are usually tensioned via screw connections arranged in the axial direction similarly to the tensioning in the case of a standard flange connection. Relatively large lever arms generate high overturning torques and lead to bulky components in the case of these connections as well.

Damage that has occurred in the form of torn-off bolts shows that mainly the bolts are the components most susceptible to fatigue fracture in this type of connection because of the pulsating loads.

SUMMARY AND OBJECTS OF THE INVENTION

The object of the present invention is to eliminate the above-described drawbacks of the various connections or to minimize them such that minimal overturning torques and consequently minimal deformations of the supporting components are generated by generating the smallest, theoretically possible lever arm on which the forces of the different connections, which are to be transmitted, act. Besides a more economical manufacture of the connection, the bolts should no longer be the component bearing the main load.

According to the invention, a detachable connection of rotationally symmetrical components for the nonpositive and positive-locking connection of the rotationally symmetrical components is provided with a one-part (one piece) sleeve surrounding two collars of two tubular or cylindrical attachment elements (attachments). The sleeve has two conical contact surfaces on its inside. A plurality of wedge-shaped tensioning elements are provided between the conical contact surfaces and the flat faces of the collars. The flat surfaces are located opposite the contact surfaces of the tubular or cylindrical attachments and are tensioned by means of tension bolts between the collars and the sleeve.

The invention also provides a detachable connection of rotationally symmetrical components for the nonpositive and positive-locking connection of rotationally symmetrical components with a one-part sleeve provided on one of the components to be connected. A part of the sleeve surrounding the collar of the component has an inner, conical contact surface. A plurality of wedge-shaped tensioning elements are provided between the contact surface and a flat surface of the collar or of the component to be tensioned, which flat surface is located opposite the contact surface between the collar and the sleeve or between the component and the sleeve. These are tensioned by means of tension bolts between the collar or between the component to be tensioned and the sleeve.

The angle of a screw axis of the holes with respect to a radial direction is preferably half the wedge angle of the tensioning element. The contact surface of the tensioning elements on the collar or on the component to be tensioned is preferably located in the immediate vicinity of the load-bearing connection structure.

The collars or the component to be tensioned are preferably alternatively directed inwardly, and the entire connection of the components to be tensioned is also arranged on the inside.

The rotationally symmetrical components to be tensioned are tensioned against each other by tensioning elements, which are uniformly distributed on the circumference, have a wedge-shaped design, and are pulled into the sleeve by means of bolts in the radial and axial directions. The sleeve surrounds the components to be connected, and it may be arranged stationarily on one of the components, corresponding to the type of connection. Toward the open end, the sleeve has turn-outs with a conical contact surface, with which the tensioning elements are in contact with a wedge surface. The opposite wedge surface of the tensioning elements is in contact with the component to be connected. It is located in the immediate vicinity of the load-bearing cylinder wall, so that the smallest, theoretically possible lever arm is generated, with which the opposite forces present act on the components to be tensioned axially. In the area of the turn-out, the sleeve has holes, which are arranged at an angle to the radial direction which corresponds to half the wedge angle of the tensioning elements. The axis of the holes is also the bolt axis. The tensioning elements are pulled into the sleeve through the holes of the sleeve by means of bolts and are tensioned against each other such that a nonpositive and positive-locking connection becomes established between the components to be tensioned and the sleeve.

This optimal lever arm cannot be obtained with the features of the prior-art connections. The overturning torque acting on the components according to the present invention is correspondingly small compared with the prior-art connections because of the nearly direct flux of force, so that only minimal deformations of the components to be connected become established in all load states.

To obtain fundamental orders of magnitude of the deformations and statements on the stresses occurring in the entire connection, three-dimensional investigations were performed by stress analysis. The optimal conditions according to the present invention in terms of minimal deformations of the components to the tensioned were confirmed. These show that an advantageous displacement of the application of force toward the axis of rotation becomes established because of the different, albeit only minimal overturning of the components. This brings about a reduction in the lever arm and leads to a load relief for all components.

Very high loads, and, in the case of flange connections, extreme pressure, temperature and auxiliary loads can be absorbed with the nonpositive and positive-locking connection according to the present invention regardless of the diameter for different connections. While the loads occurring are transmitted exclusively by bolts in the prior-art connections, the flux of force now becomes established primarily via the tensioning elements and the sleeve. The bolts are loaded only by a small percentage of the forces and torques to be transmitted. They no longer represent the most heavily loaded component. The actual task of the bolts after the tensioning process is only to fix the tensioning elements in their positions, so that considerably shorter bolts of a smaller diameter are needed. The setting of the threads as a consequence of relaxation, which occurs in dominantly loaded bolts of the prior-art connections as a matter of principle, is no longer relevant.

Moreover, only slight deformations of the contact surfaces and consequently an insignificant and minimal gaping of the collars to be connected occur in the case of the flange connection design, so that optimal conditions are created for tightness. Due to the fact that it is now possible to use seals located in the secondary flux of force, the effects of the creep of a seal located in the main flux of force, which adversely affected the flange connection before, and which frequently lead to tightness problems, especially under pulsating and alternating loads as well as under loads caused by external heat radiation, e.g., in the steel-making industry, are no longer present.

It was made possible in all flange connections, especially in the case of the primaryside and secondary-side manhole locks on steam generators in nuclear power plants, to eliminate the need for the application and checking of the necessary strong prestraining forces required by the seals arranged in the main flux of force, which was complicated according to the state of the art. By designing the manhole locks according to the present invention, it is possible, besides a considerable reduction in weight, to use O-ring seals located in the secondary flux of force, which require only relatively weak prestraining forces.

In the case of flange connections which are subject to low operating pressures and at the same time high temperature loads, the application of the strong prestaining forces, which is necessary in the prior-art connections, no longer represents the determining type of burden for dimensioning.

Moreover, the radial temperature gradient in flange connections subject to extreme temperature loads causes an overturning of the flanges in the same direction as the internal pressure. Due to the compact design of the entire connection, this effect is reduced to a minimum, unlike in the prior-art connections, in which the components to be connected project widely, and it leads to a load relief for the entire connection.

In the case of cast housings for large machines, the reject rate is relatively high during the casting of the housings in the area of the rotationally symmetrical connection flanges designed as standard flanges according to the state of the art. Compared with the cylindrical tube attachment, the large-volume flange has a high heat potential after the casting process, so that shrinkage cracks develop in the area of the transition between the flange and the connection cylinder during cooling. In contrast, the flange collar has a relatively small volume in the design according to the present invention, so that the above-described problems will not occur here, either, unlike in all prior-art connections.

Another advantage is the low machining costs for a machine housing and on the pipeline fittings valves, slide vales). These costs are greatly reduced, because the collar prepared by machining on a horizontal boring machine requires only a fraction of the machining time necessary for a flange corresponding to the features of prior-art connections. The other parts of the connection according to the present invention are manufactured as individual components separately and at low cost.

Contrary to the prior-art flange connections, which are dimensioned according to the design specifications of the ASME Code, the design according to the present invention brings with it a great reduction in weight, because the permissible stresses of the bolt materials are specified in these specifications at considerably lower levels than in other design specifications. It follows from this that bolts with larger diameters are needed in flange connections according to the state of the art. These bolts require larger lever arms, so that greater flange leaf thicknesses are needed.

If a flange connection is dimensioned according to the present invention, the bolts affect the overall construction only insignificantly. The relatively low permissible stresses corresponding to the ASME Code are no longer relevant.

Pipeline flange connections can be manufactured at an especially low cost, because thick-walled forged blanks are not necessary any more.

When large rolling bearings are tensioned with the connection structure according to the present invention, the reliability of operation of the large rolling bearings is considerably increased, because the strict maintenance and testing specified by the manufacturer for tensioning by means of prior-art connections is no longer necessary. Due to the smallest, theoretically possible lever arm, an optimal flux of force becomes established through the components in the vicinity of the line of force application. The requirements in terms of concentration of the contact pressure of the bearing tensioning in the vicinity of the line of force action are satisfied.

Similarly to the design of a flange connection, an optimal flux of force becomes established in the case of the tensioning of cover locks of high-pressure cylinders by means of the connection according to the present invention, and this optimal flux of force makes possible a lighter design of the entire connection and consequently a more economical manufacture. The bolts, which are highly susceptible to fatigue fracture in the prior-art connections because of the continuously present pulsating loads, are also greatly relieved, because they must absorb only a small percentage of the total force to be transmitted.

The device according to the present invention can be used to tension or anchor steel smokestacks and in vertically erected, cylindrical containers. Similarly to the tensioning of large rolling bearings, the stationary part of the sleeve is made available at the construction site in advance for anchoring in the foundation, while the smokestack or the cylindrical container with the collar provided on it is put in place and tensioned later. The base ring templates, which are necessary in the state of the art and must be drilled together with the base ring structure to ensure dimensional accuracy, are no longer necessary, either, nor is an accurate positioning of the anchoring. Problems with manufacturing tolerances of pipelines to be connected are diminished because of the rotatingly freely tensionable components.

In the different connections described above, the maximum bolt forces occur basically only during the tensioning process, because no frictional forces need to be applied any more to maintain this state. The phenomena of bolt relaxation due to thread setting, which adversely affect the state of tensioning, are insignificant because of the relatively low bolt loads. Even though they do slightly reduce the pretension of the bolt, the bolt forces necessary for maintaining the tensioned state are still reached despite the relaxation process. To keep the relative amount of frictional forces low during the tensioning process, the sleeve can be correspondingly elongated by heating before the tensioning process in the case of especially heavily loaded connection. The proportional frictional forces of the bolt force to be applied are reduced hereby. The necessary tensioning forces become established after the cooling of the sleeve.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
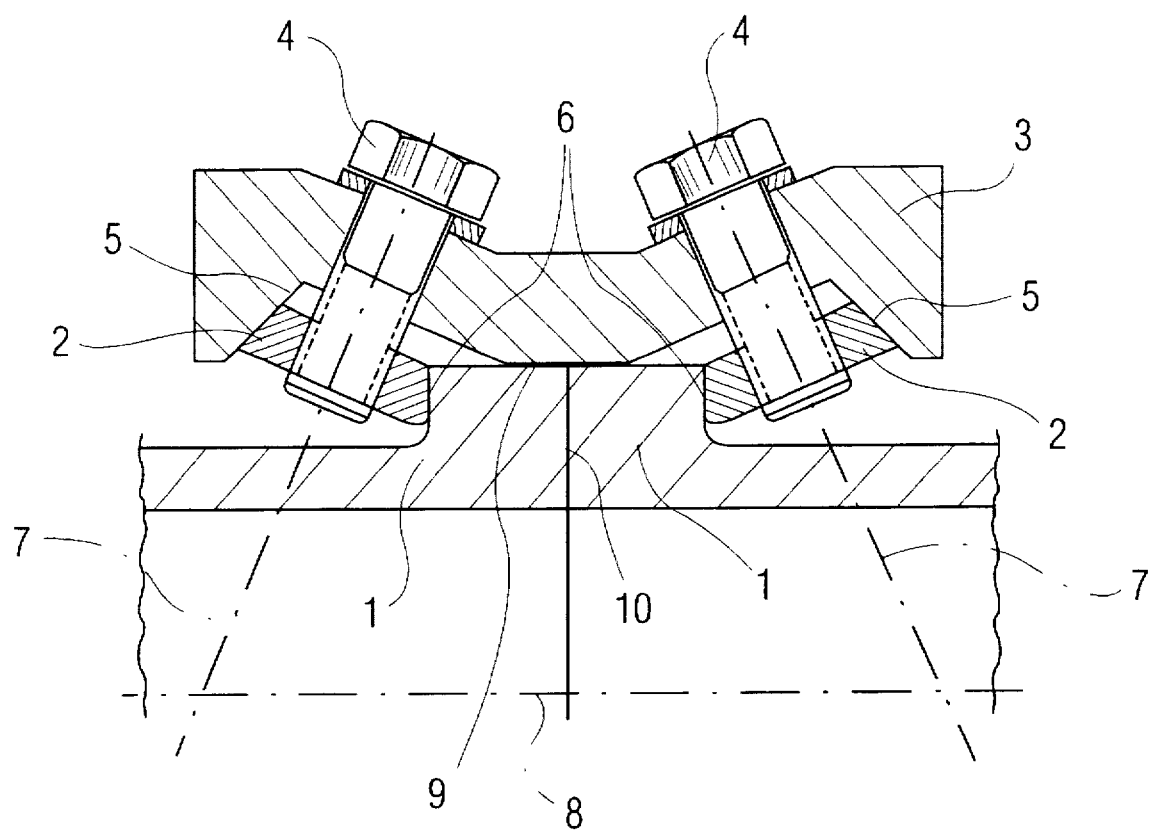
FIG. 1. is a sectional view showing the basic principle of the nonpositive and positive-locking connection, shown as a longitudinal section of a paired flange connection.

Referring to the drawings in particular, FIG. 1 shows the basic principle of the connection according to the present invention as a longitudinal section of a paired flange connection. A one-part sleeve 3 surrounds two collars with tubular or cylindrical attachments 1 made in one piece with them. The attachments 1 have mating surfaces 10 and fastening surfaces 6. Wedge-shaped tensioning elements 2 are pulled in in the direction of the bolt axis 7 by means of tension bolts 4 between the flat fastening surfaces 6 of the collars and the conical or slanted contact surfaces 5 of the sleeve 3. A nonpositive and positive-locking connection is brought about between the collars 1 and the sleeve 3 by means of the tensioning elements 2. The outer structure of the sleeve 3 is represented in the exemplary embodiment corresponding to a bolt design with head. In the case of hexagon socket bolt designs, the sleeve 3 has a smooth outer structure with countersunk holes, shown in the exemplary embodiment according to FIG. 5. The annular gap 9 between the sleeve 3 and the collars 1 is not larger than is needed for assembly.

Figure 2:
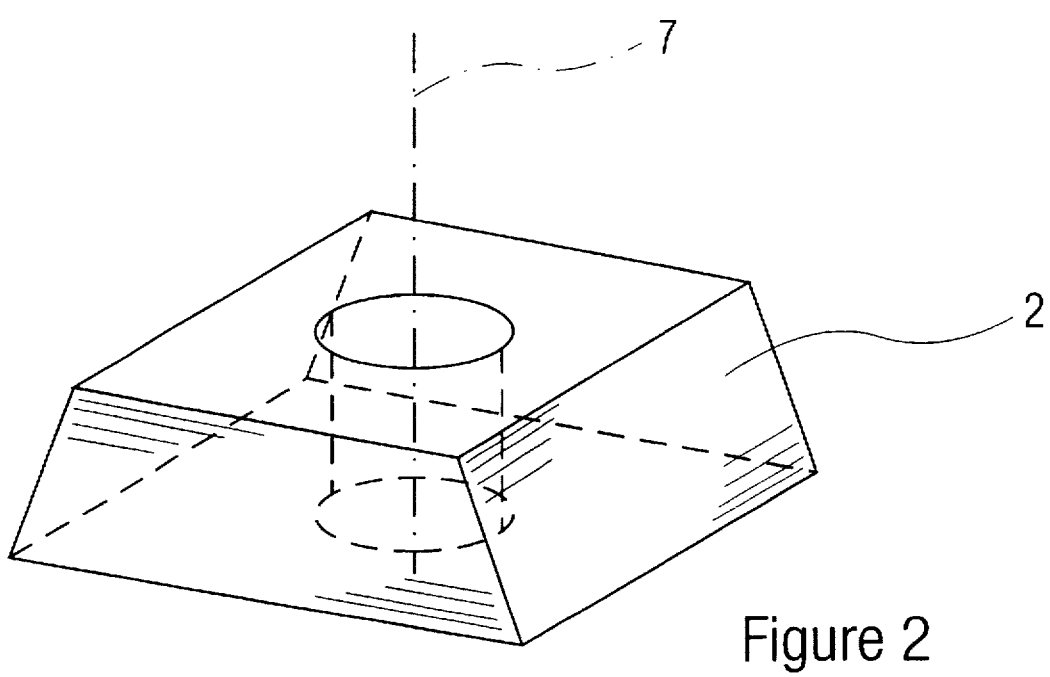
FIG. 2. is a perspective view of the wedge-shaped tensioning element.

FIG. 2 shows a perspective view of the wedge-shaped tensioning element. The tensioning elements have internal threads and are, in principle, nuts with two opposite wedge surfaces. Corresponding to the diameter of the connection, the tensioning elements may be made larger in the circumferential direction and have a plurality of internal threads. This causes a simplification of the tensioning process.

Figure 3:
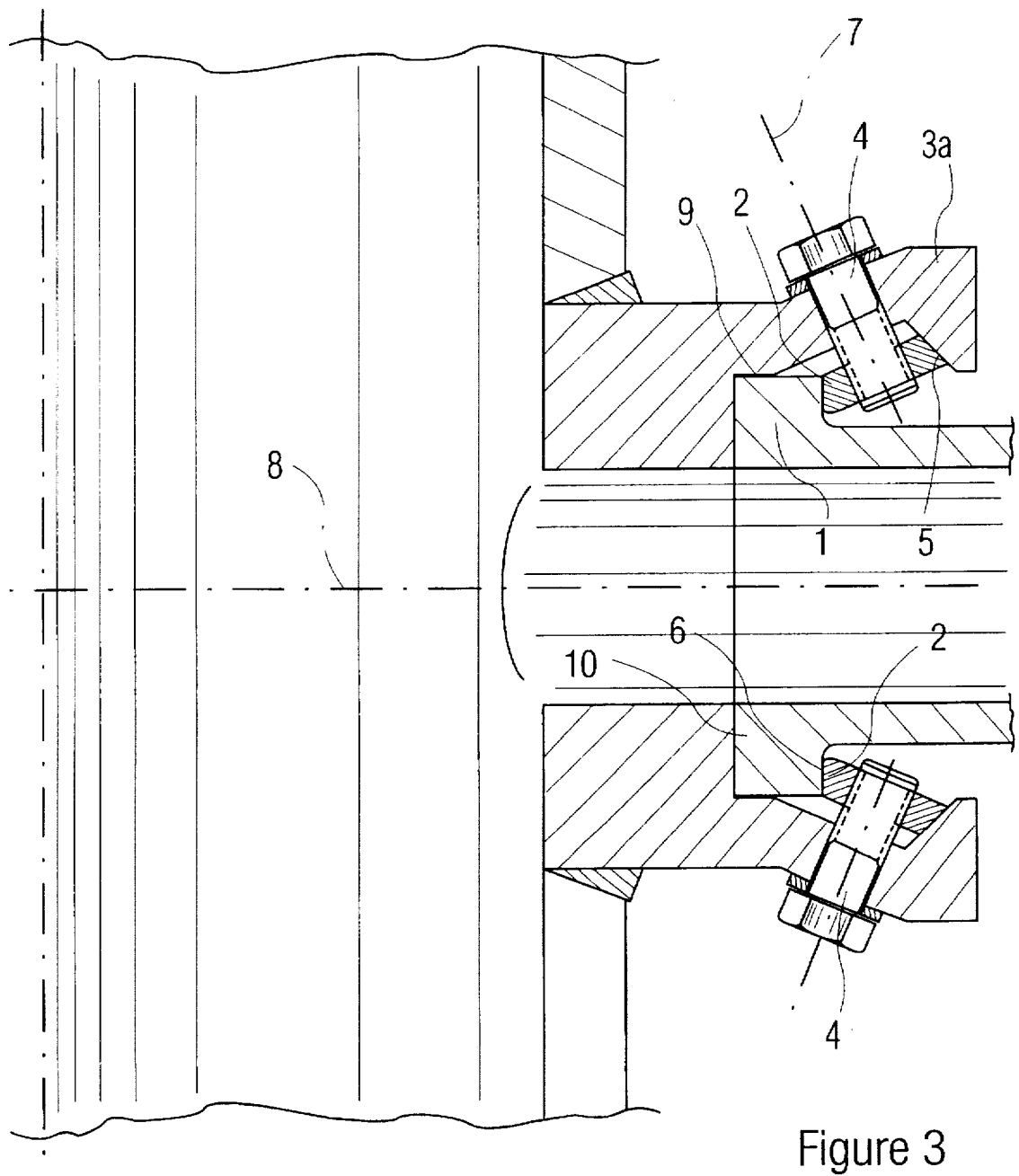
FIG. 3. is a sectional view of the connection of a pipeline to a container.

FIG. 3 shows the connection of a pipeline to a container. In a sectional view, a pipe connection is detachably connected to a sleeve 3a, which has only one conical contact surface 5. It surrounds a collar with a tubular attachment 1 provided on it. The tensioning is performed analogously to the representation in FIG. 1.

Figure 4:
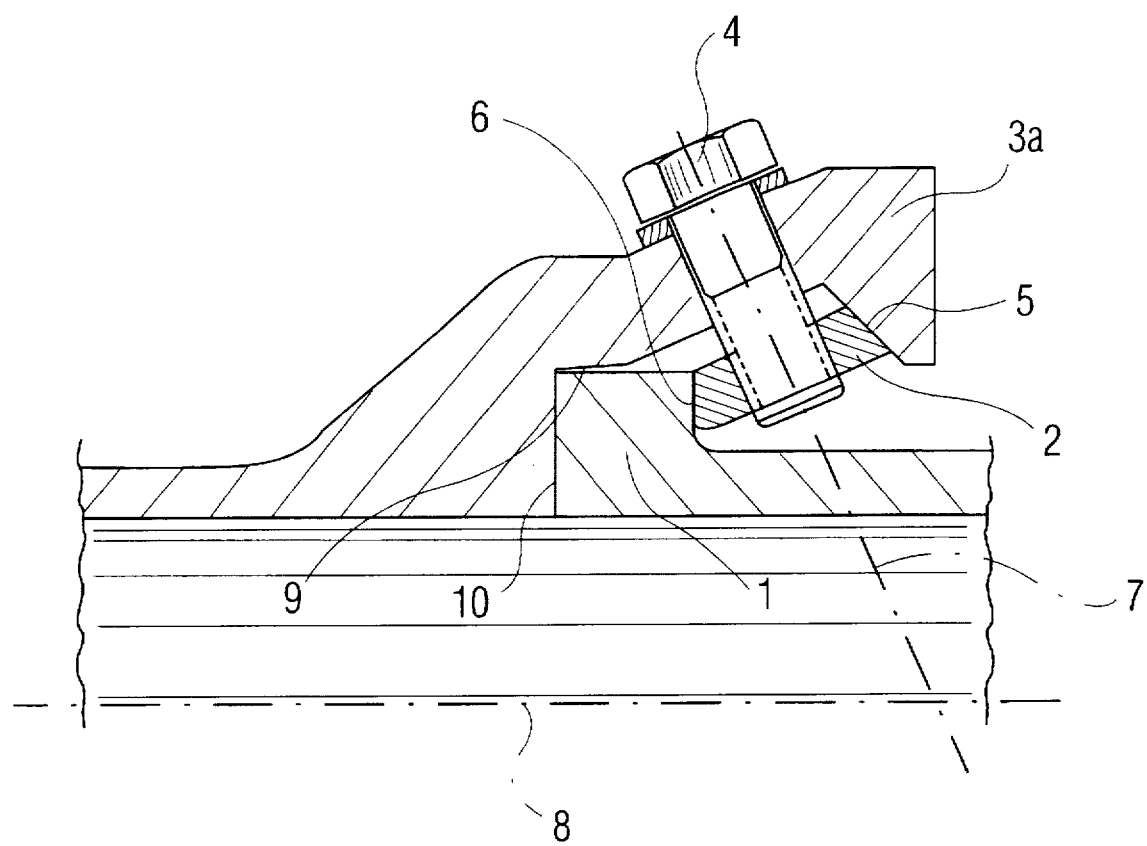
FIG. 4. is a longitudinal sectional view of a unpaired flange connection.

FIG. 4 shows the longitudinal section of an unpaired connection, wherein a pipe connection is also detachably connected to a sleeve 3a, which has only one conical contact surface 5. Analogously to the representation in FIG. 3, this sleeve also has only one conical contact surface 5, which in turn surrounds only one collar with a tubular attachment 1 provided on it. While the exemplary embodiment shown in FIG. 4 represents the standard case of a pipeline flange connection, the application of the design corresponding to FIG. 1 is necessary, e.g., in the case of the connections of valves and fittings to pipelines or to machine connections because of crowded space conditions. In order not to have to detach entire pipelines, the components can be fitted together on the side.

Figure 5:
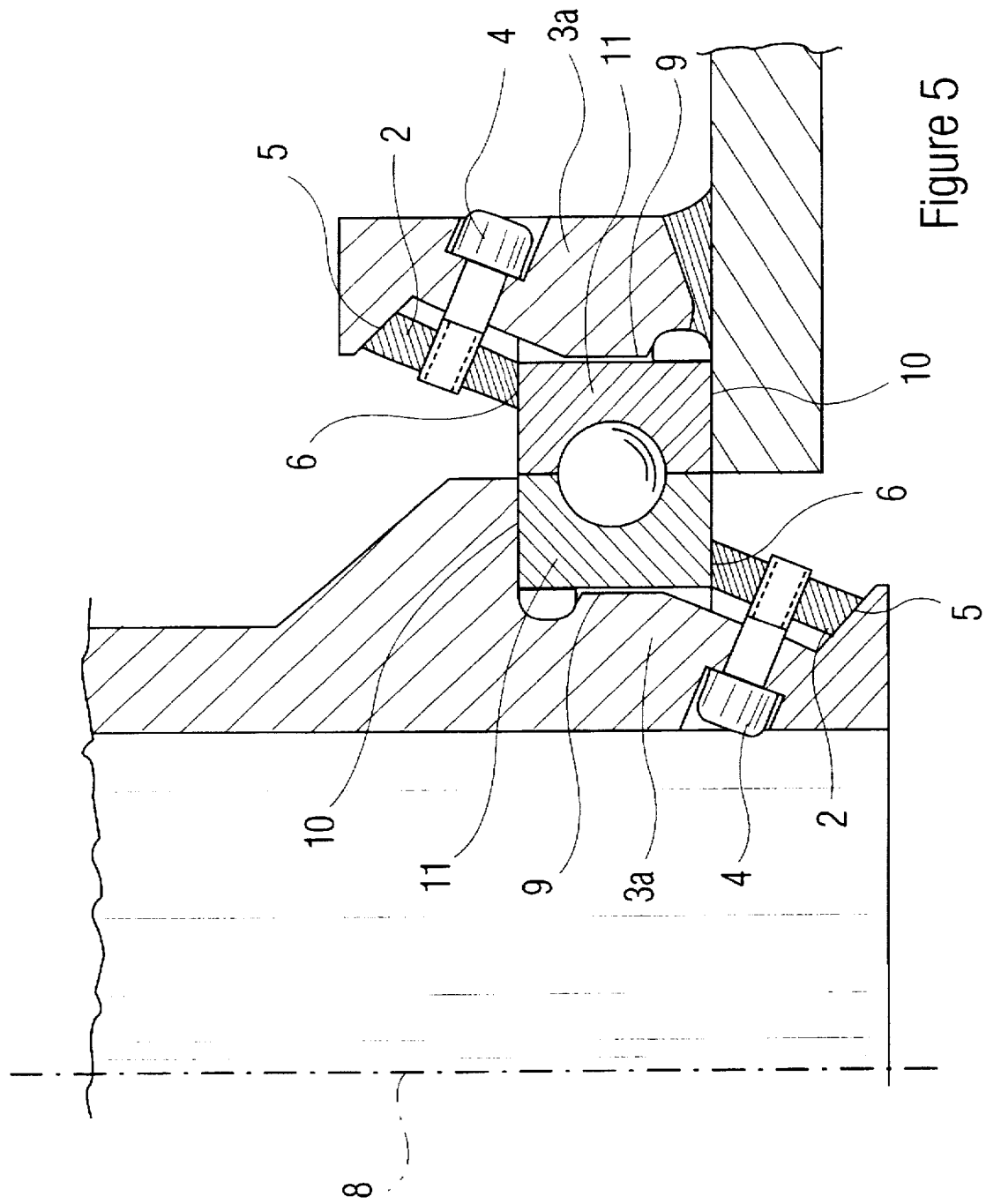
FIG. 5. is a longitudinal sectional view of a large rolling bearing tensioned with the connection structure of the invention.

FIG. 5 shows a longitudinal section of a single-row large rolling bearing 11 comprising an inner ring and an outer ring component to be connected with the connection to the stationary and nonrotatable connection structure. The tensioning elements 2 are pulled in by means of tension bolts 4 between the ball bearing slewing ring 11 and the sleeve 3a. A nonpositive and positive-locking connection is brought about between the inner and outer rings of the large rolling bearing 11 and the sleeve 3a by means of the respective tensioning elements 2. While the outer ring of the large rolling bearing 11 is connected via the tensioning elements 2 to the inner, conical contact surface 5 of the sleeve 3a, the tensioning of the inner ring becomes established according to this variant of the invention via an outwardly located, conical contact surface 5 of the sleeve 3a. The outer structures of the sleeves 3a are represented corresponding to a hexagon socket bolt design tension bolt 4 with countersunk holes.

As is apparent from FIG. 1 and FIGS. 3–5, the flat surfaces 6 of the collars 1 are arranged in the immediate vicinity of the load-bearing connection structure and of the component to be tensioned.

While specific embodiments of the invention have been shown and described in detail to illustrate the application of the principles of the invention, it will be understood that the invention may be embodied otherwise without departing from such principles.

What is claimed is:

1. A detachable connection of rotationally symmetrical components for a nonpositive and positive-locking connection of the rotationally symmetrical components, comprising:

two collars including a collar of one tubular or cylindrical attachment and another collar of a second tubular or cylindrical attachment said collars each having a flat surface;

a one-part sleeve surrounding said two collars, said sleeve having an inside surface defining two conical contact surfaces, each of said contact surfaces being located opposite one said flat surface;

a plurality of wedge-shaped tensioning elements, each of said wedge-shaped tensioning elements being disposed between one of said conical contact surfaces and a flat surface of one of said collars; and tension bolts, each of said tensioning bolts for tensioning one of said wedge-shaped tensioning elements between one of said collars and said sleeve.

2. A detachable connection in accordance with claim 1, wherein said sleeve includes a hole for each of said tension bolts, each said hole having a screw axis angle with respect to a radial direction of the rotationally symmetrical components which is half a wedge angle of said tensioning elements, and a contact surface of said tensioning elements on said collar or on a component to be tensioned is located in an immediate vicinity of a load-bearing connection structure.

3. A detachable connection in accordance with claim 1, wherein said collars are directed inwardly with respect to a radial direction of the rotationally symmetrical components, and the detachable connection of the components to be tensioned is also arranged on an inside of the rotationally symmetrical components.

4. A detachable connection of rotationally symmetrical components, for the nonpositive and positive-locking connection of rotationally symmetrical components, the detachable connection comprising:

a collar provided on one of the components to be connected, said collar having a flat surface;

a sleeve provided on another of the components to be connected, a part of said sleeve surrounding said collar and having an inner, conical contact surface;

a plurality of wedge-shaped tensioning elements each of said wedge-shaped tensioning elements being disposed between said contact surface and the said flat surface between one of said collar and said sleeve and between said component and said sleeve, said flat surface being located opposite said contact surface; and tension bolts disposed between said sleeve and one of said collar and a component to be tensioned and the said sleeve.

5. A detachable connection in accordance with claim 4, wherein said sleeve includes a hole for each of said tension bolts, each said hole having a screw axis angle with respect to a radial direction of the rotationally symmetrical components which is half a wedge angle of said tensioning elements, and a contact surface of said tensioning elements on said collar or on a component to be tensioned is located in an immediate vicinity of a load-bearing connection structure.

6. A detachable connection in accordance with claim 4, wherein said collars are directed inwardly with respect to a radial direction of the rotationally symmetrical components, and the detachable connection of the components to be tensioned is also arranged on an inside of the rotationally symmetrical components.

7. A connection comprising:

a first part with a fastening surface and a mating surface;

a second part with a slanted surface arranged at an angle to said fastening surface, said slanted surface being positioned opposite said fastening surface, said second part also being connected to another mating surface, said mating surface and said another mating surface being positioned adjacent each other;

a wedge element positioned between said fastening surface and said slanted surface;

tension means connected to said wedge element and said second part for applying force to said wedge element and forcing said slanted and said fastening surfaces apart, said force applied to said wedge element also forcing said mating and said another mating surfaces together.

8. A connection in accordance with claim 7, wherein:

said another mating surface is formed in one piece with said second part.

9. A connection in accordance with claim 7, wherein:

said another mating surface is arranged on a third part, with said third part being mechanically connected to said second part.

10. A connection in accordance with claim 9, wherein:

another fastening surface is arranged on said third part;

said second part includes another slanted surface arranged at another angle to said another fastening surface, said another slanted surface being positioned opposite said another fastening surface;

another wedge element positioned between said another fastening surface and said another slanted surface;

another tension means connected to said another wedge element and said second part for applying force to said another wedge element and forcing said another slanted and said another fastening surfaces apart, said force applied to said another wedge element also forcing said mating and said another mating surfaces together.

11. A connection in accordance with claim 7, wherein:

said fastening surface and said wedge element are annular.

12. A connection in accordance with claim 11, wherein:

said first and second parts are rotationally symmetrical;

said fastening surface is radial;

said slanted surface is conical;

said fastening surface and said slanted surface define a wedge angle;

said tension means includes a plurality of threaded bolts engaging with threaded holes defined by said wedge element, said threaded holes having a screw axis at a screw angle with respect to a radial direction of said rotationally symmetrical parts, said screw angle being half said wedge angle;

a contact surface of said wedge element on said fastening surface is located in an immediate vicinity of a load-bearing connection structure.

13. A detachable connection in accordance with claim 7, wherein:

said first and second parts are rotationally symmetrical;

said tensioning means forces said wedge element in a direction radially outward of said second part;

said tensioning means is operated by a user from a radially outer side of said second part.

14. A detachable connection in accordance with claim 7, wherein:

said first and second parts are rotationally symmetrical;

said tensioning means forces said wedge element in a direction radially inward of said second part;

said tensioning means is operated by a user from a radially inner side of said second part.

* * * * *